United States Patent
Choi

(10) Patent No.: US 6,598,233 B1
(45) Date of Patent: Jul. 22, 2003

(54) CHANNEL CONTROL APPARATUS OF DIGITAL TELEVISION AND METHOD THEREOF

(75) Inventor: Kyung Rok Choi, Daeku (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/679,637

(22) Filed: Oct. 5, 2000

(30) Foreign Application Priority Data

Oct. 6, 1999 (KR) .................................... 1999-43062

(51) Int. Cl.⁷ .................... H04N 5/445; H04N 7/20; H04N 7/173; H04N 7/16; H04N 5/50
(52) U.S. Cl. .................... 725/151; 725/38; 725/68; 725/70; 725/131; 725/134; 725/139; 348/731
(58) Field of Search ................... 348/731; 725/68, 725/70, 134, 131, 139, 142, 151, 38

(56) References Cited

U.S. PATENT DOCUMENTS

| | | | |
|---|---|---|---|
| 5,594,492 A | * 1/1997 | O'Callaghan et al. | 348/10 |
| 5,600,378 A | * 2/1997 | Wasilewski et al. | 348/468 |
| 5,666,293 A | * 9/1997 | Metz et al. | 395/200.5 |
| 5,708,961 A | * 1/1998 | Hylton et al. | 455/4.2 |
| 5,864,358 A | * 1/1999 | Suzuki et al. | 348/10 |
| 5,872,588 A | * 2/1999 | Aras et al. | 348/1 |
| 5,920,572 A | * 7/1999 | Washington et al. | 370/535 |
| 5,923,812 A | * 7/1999 | Sakazaki et al. | 386/68 |
| 5,959,659 A | | 9/1999 Dokic | 348/7 |
| 5,966,385 A | * 10/1999 | Fujii et al. | 370/465 |
| 6,035,037 A | * 3/2000 | Chaney | 380/10 |
| 6,115,080 A | * 9/2000 | Reitmeier | 348/371 |
| 6,147,714 A | * 11/2000 | Terasawa et al. | 348/564 |
| 6,175,577 B1 | * 1/2001 | Van Den Heuvel | 370/537 |
| 6,219,067 B1 | * 4/2001 | Dieterich | 345/440 |
| 6,263,506 B1 | * 7/2001 | Ezaki et al. | 725/116 |
| 6,314,573 B1 | * 11/2001 | Gordon et al. | 725/61 |
| 6,317,885 B1 | * 11/2001 | Fries | 725/109 |
| 6,366,326 B1 | * 4/2002 | Ozkan et al. | 348/558 |
| 6,427,150 B1 | * 7/2002 | Cashi et al. | 707/10 |
| 6,477,185 B1 | * 11/2002 | Komi et al. | 370/536 |

FOREIGN PATENT DOCUMENTS

| | | | |
|---|---|---|---|
| EP | 0 735 776 A2 | 10/1996 | ................ 7/50 |
| EP | 0 751 680 A2 | 1/1997 | ................ 5/44 |
| WO | WO 98/30023 A2 A3 | 7/1998 | ................ 5/44 |

OTHER PUBLICATIONS

Yukio Fujii et al., "Implementation of MPEG Transport Demultiplexer with a RISC–Based Microcontroller," IEEE Transactions on Consumer Electronics, vol. 42, No. 3, Aug. 1996.

French Search Report.

* cited by examiner

*Primary Examiner*—Andrew Faile
*Assistant Examiner*—Son P. Huynh
(74) *Attorney, Agent, or Firm*—Fleshner & Kim, LLP

(57) ABSTRACT

The present invention is capable of reducing a time required for channel switching, and selecting or searching a user request channel quickly by storing a packet identifiers of a video and an audio signal of a digital television channel, extracting the stored packet identifiers according to a channel switching request of a user, and outputting the video and audio signal corresponding to the user select channel.

25 Claims, 4 Drawing Sheets

CHANNEL CONTROL APPARATUS OF DIGITAL TELEVISION AND METHOD THEREOF

BACKGROUND OF THE INVENTION

1. Field of the Invention

The present invention relates to an apparatus and a method which is capable of reducing a required time for switching a channel of a television, in particular to a channel control apparatus of a digital television and a method thereof which is capable of outputting a video and an audio signal corresponding to a user select channel by storing PIDs (Packet Identifier) of the video and audio signal of the channel and extracting the stored PIDs (Packet Identifier) in accordance with a channel switching request of the user.

2. Description of the Prior Art

FIG. 1 is a block diagram illustrating the conventional channel control apparatus of a digital television. Its operation will now be described.

First, a tuner 2 receives a VSB (Vestiginal Sideband) or a QAM (Quadrature Amplitude Modulation) signal from an antenna and wave-detects it, corrects an error, converts it into a transport stream format, outputs it to a transport packet parser 3. The transport packet parser 3 is inputted the transport stream, and outputs a de-multiplexed video signal, an audio signal, and additional information.

Herein, the de-multiplexing means dividing detected packet identifiers into a video signal line, an audio signal line, and additional information line. In addition, the packet identifier provides a de-multiplexing mean for de-multiplexing a timely multiplexed signal. In other words, the video signal packet, audio signal packet, and additional information (SI) packet can be identified by detecting the packet identifiers.

After that, ah audio decoder 4 is inputted the de-multiplexed audio signal, converts it into a decoded signal, and outputs it to a DC/AC converter 5. The DC/AC converter 5 converts the decoded audio signal into an analog audio signal, and outputs it to a speaker.

A video decoder 6 is inputted the de-multiplexed video signal, converts it into a decoded signal, and outputs it into a switching unit 7.

After that, a user interface 9 outputs an operation signal corresponding to a user select channel to a microcomputer 10. The microcomputer is inputted the operation signal, and outputs a control signal in order to select a broadcasting signal of the channel selected by the user. In addition, the microcomputer 10 is inputted the additional information from the transport packet parser 3, processes it, and outputs it to a memory 11. The memory 11 stores the additional information according to the control signal.

An on screen display extracts on screen information corresponding to the operation signal from the memory 11, and outputs an on screen display video signal.

A switching unit 7 is inputted the decoded video signal and on screen display video signal from the video decoder 6, and performs a switching operation in order to output the decoding video signal and on screen display video signal selectively in accordance with the control signal.

A NTSC encoder (National Television System Committee Encoder) 8 is selectively inputted a signal outputted from the switching unit 7 in order to display the video signal on a CRT, and outputs a luminance signal and a chrominance signal.

FIG. 2 is a flow chart illustrating the conventional channel control method of the digital television. It will now be described in detail.

First, it is judged whether the user selects a request channel by using a channel transfer key S1.

In the result of the judging step, when the user selects the request channel, an audio signal and a video signal are stopped temporarily S2

When the audio signal and video signal are stopped for a time, a phase-locked loop data value is set on the tuner in order to switch the channel to the user request channel S3.

After parsing a PAT (Program Association Table)/PMT (Program Map Table) or a TVCT (Terrestrial Virtual channel Table), the packet identifiers of the audio and video signal of the user request channel are extracted, and the selected packet identifiers are set on the transport packet parser 3.

After setting the selected PIDs, when the video and audio signal are decoded on the decoder through the set PIDs, the video and audio signal stopped temporarily are released S5.

However, in the conventional channel control apparatus for the digital television and the method thereof, when the user requests a channel, a time for switching the channel of the digital television is required a lot because the conventional technology performs parsing of the PAT (Program Association Table)/PMT (Program Map Table) or TVCT (Terrestrial virtual Channel Table).

For example, in switching from the present channel to the other channel, the user has to spend a lot of time to watch the other picture from the present picture because of the time required for the parsing.

SUMMARY OF THE INVENTION

The object of the present invention is to provide a channel control apparatus of a digital television and a method thereof which is capable of performing selectively parsing of a PAT (Program Association Table)/PMT (Program Map Table), or a TVCT (Terrestrial virtual channel Table) in order to switch to a user select channel promptly.

In order to achieve above-mentioned object, the channel control apparatus of the digital television for outputting a user request video and audio by controlling a channel of the digital television comprises a transport packet parser for extracting a packet identifier of a video, audio and additional information of a user select channel, a microcomputer for storing the extracted packet identifiers on a memory, and setting the stored packet identifiers on the transport packet parser, and a decoder for decoding the video and audio signal after receiving the signals through the set packet identifiers.

In addition, the channel control method of the digital television comprises a judging process for judging whether the packet identifiers of the video and audio signal corresponding to the user select channel are stored on the memory when the user selects a request channel, a setting process for setting the stored packet identifiers of the video and audio signal on the transport packet parser when the packet identifiers of the video and audio signal are stored on the memory, and a decoding process for decoding the video and audio signal after being inputted the video and audio signal corresponding to the user select channel through the set packet identifiers of the video and audio signal.

DETAILED DESCRIPTION OF THE PREFERRED EMBODIMENT

Figure 1:
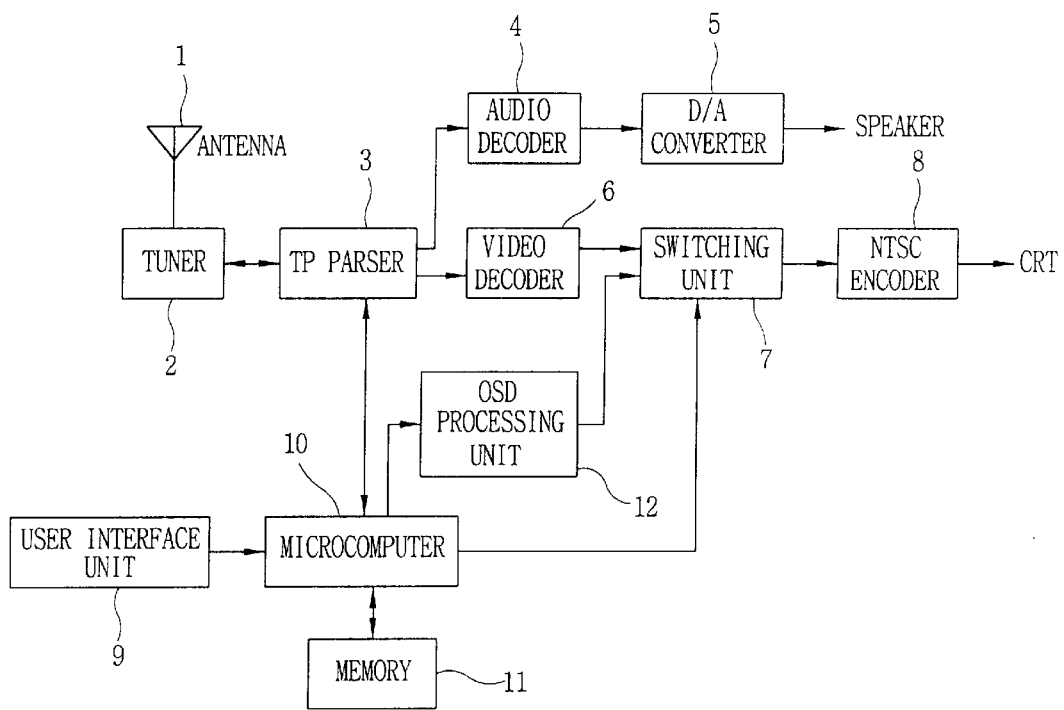
FIG. 1 is a block diagram illustrating the conventional channel control apparatus of a digital television.
Figure 2:
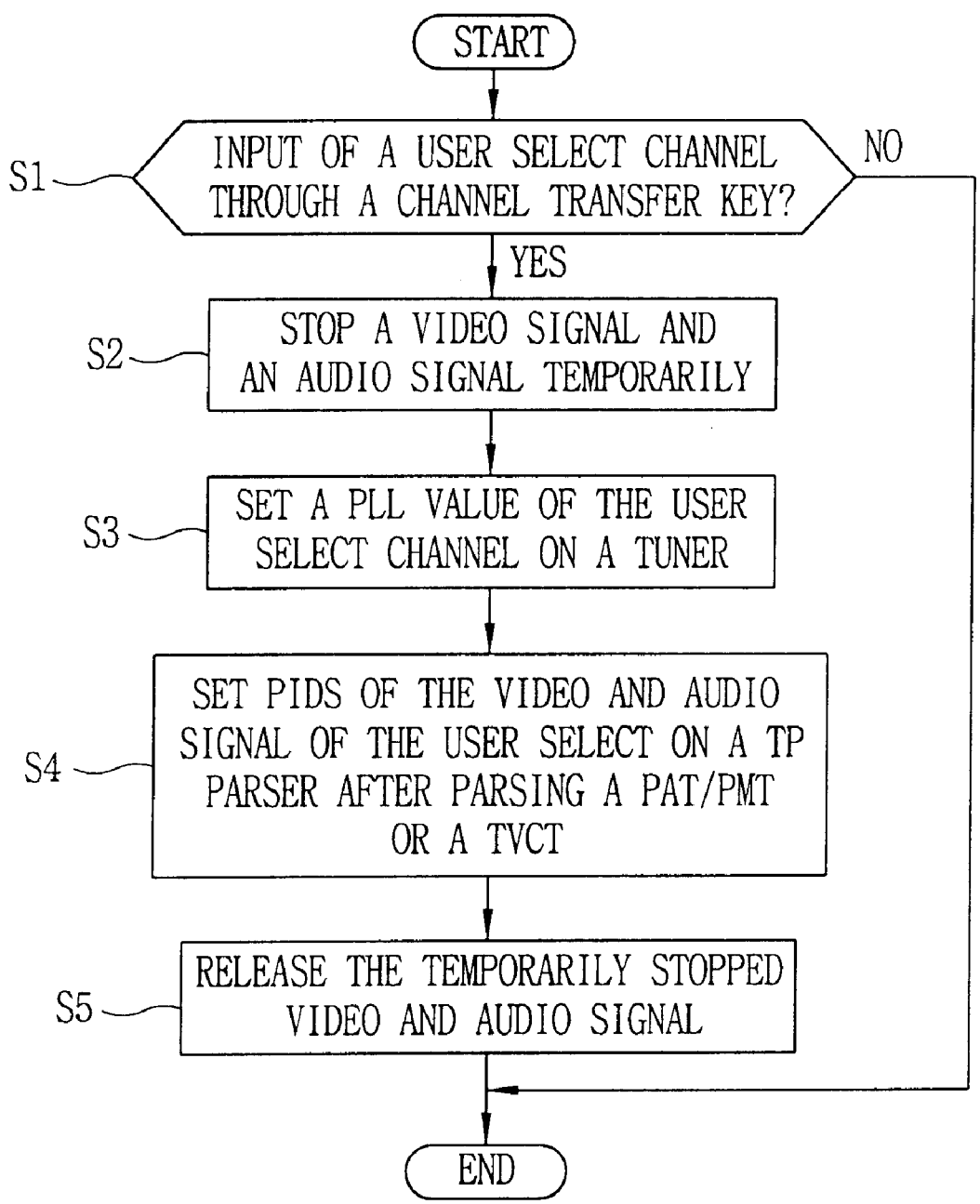
FIG. 2 is a flow chart illustrating the conventional channel control method of a digital television.
Figure 3:
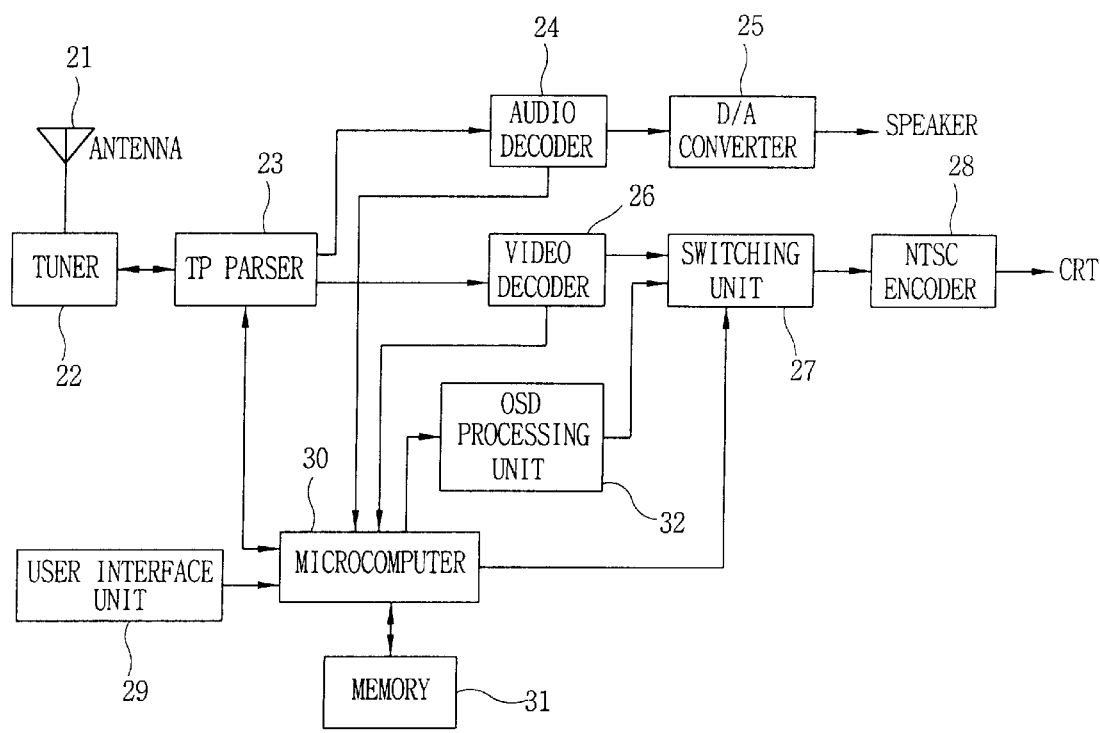
FIG. 3 is a block diagram illustrating a channel control apparatus of a digital television according to the present invention.

FIG. 3 is a block diagram illustrating a channel control apparatus of a digital television according to the present invention.

As depicted in FIG. 3, the channel control apparatus of the digital television comprises a tuner 22 for receiving a VSB (Vestiginal Sideband) or a QAM (Quadrature Amplitude Modulation) signal, converting it into a transport stream format, and outputting it, a transport packet parser 23 for outputting a de-multiplexed video signal, audio signal and additional information by receiving the transport stream and extracting packet identifiers corresponding to the signals, an audio decoder 24 for being applied the audio signal through the extracted audio signal packet identifier and decoding it, a DC/AC converter 25 for converting the decoded signal into an analog signal, a video decoder 26 for being applied the video signal through the extracted video signal packet identifier and decoding it, a user interface 29 for outputting an operation signal corresponding to a user select channel, a memory 31 for storing the packet identifiers of the extracted audio/video signal, a microcomputer 30 for outputting a control signal for controlling the tuner 22 in order to select a broadcasting signal of the user select channel by being inputted the operation signal and judging whether the packet identifiers of the video/audio signal corresponding to the user select channel are stored on the memory 31, an OSD (On Screen Display) processing unit 32 for outputting an OSD (On Screen Display) video signal by receiving the packet identifier of the extracted additional information, a switching unit 27 for outputting selectively the decoding video signal and OSD video signal in accordance with the control signal, and a NTSC (National Television System Committee) encoder 28 for outputting a luminance signal and a chrominance signal by being inputted the signal outputted from the switching unit 27 in order to display the video signal on a CRT. The operation will now be described in detail.

First, the tuner 22 receives a VSB Vestiginal Sideband) or a QAM (Quadrature Amplitude Modulation) signal from an antenna, converts it into a transport stream format, and outputs it.

Herein, the transport stream means a digital signal timely multiplexed video, audio, data and broadcasting information as a packet unit. It is represented in ISO/IEC 13818 in detail.

The transport packet parser 23 outputs de-multiplexed video signal, audio signal, additional information by being inputted the transport stream, and extracts packet identifiers corresponding to it. Herein, the extracted packet identifiers of the video signal and audio signal are stored on the memory 31.

The audio decoder 24 is applied the audio signal through the extracted packet identifier of the audio signal, decodes it, and outputs it to the DC/AC converter 25. The DC/AC converter 25 converts the inputted decoded signal into an analog signal, and outputs it to a speaker.

After that, the video decoder 26 is applied the video signal through the extracted packet identifier of the video signal, and decodes it.

The user interface 29 outputs the operation signal corresponding to the user select channel to the microcomputer 30. The microcomputer 30 is inputted the operation signal, and outputs the control signal for controlling the tuner 22 in order to select the broadcasting signal of the user select channel. In addition, the microcomputer 30 judges whether the packet identifiers of the audio signal and video signal corresponding to the user select channel are stored on the memory 31.

In the result of the judging, when the extracted packet identifiers of the audio signal and video signal are stored on the memory 31, the microcomputer 30 sets the stored packet identifiers of the video signal and audio signal on the transport packet parser 23.

Herein, the audio decoder 24 is inputted the audio signal through the set audio signal packet identifier, decodes it, and performs feedback to the microcomputer 30.

In addition, the video decoder 26 is inputted the video signal through the set video signal packet identifier, decodes it, and performs feedback to the microcomputer 30.

After that, the microcomputer 30 judges whether the feedback decoded signal is decoded normally. In the result of the judging result, when the feedback decoded signal is not decoded normally, the microcomputer 30 controls the transport packet parser 23 in order to re-extract the packet identifiers of the audio signal and video signal.

After, the switching unit 27 is inputted the decoded video signal from the video decoder 26 and the OSD video signal, and performs the switching operation in order to output the decoded video signal and OSD video signal selectively in accordance with the control signal of the microcomputer 30.

The NTSC encoder 28 is inputted the signal outputted selectively from the switching unit 27, and outputs a luminance signal and a chrominance signal.

Figure 4:
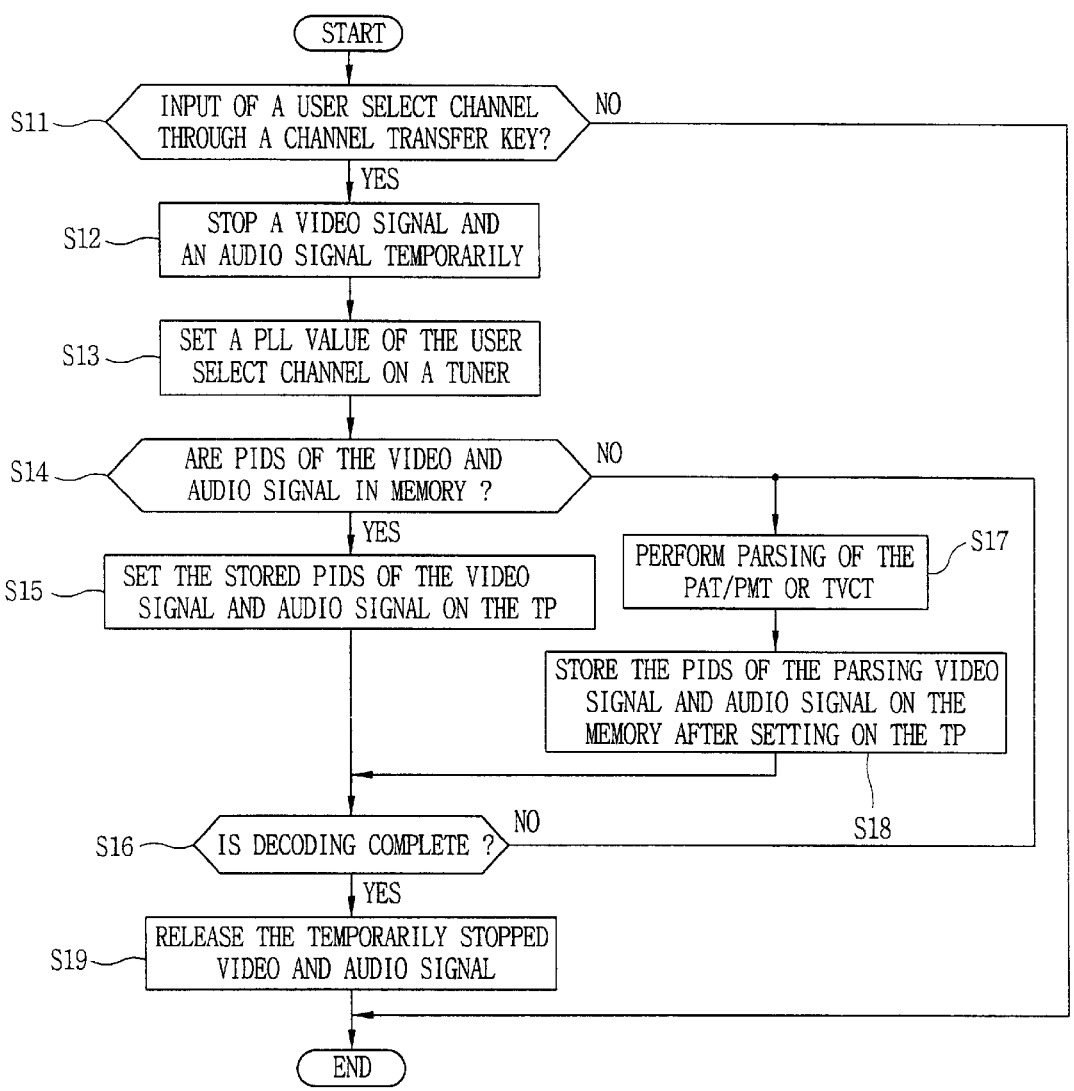
FIG. 4 is a flow chart illustrating a channel control method of a digital television according to the present invention.

FIG. 4 is a flow chart illustrating a channel control method of a digital television according to the present invention. It will now be described.

First, it is judged whether a user selects a request channel by using a channel transfer key S11.

In the result of the judging, when the user selects the request channel by using the channel transfer key, an audio signal and a video signal are stopped temporarily S12.

When the audio signal and video signal are stopped temporarily, a phase-locked loop data value is set on the tuner in order to switch the channel into the user request channel S13.

After, it is judged whether the video signal and audio signal packet identifiers of the channel switched through the tuner are stored on the memory 31 S14.

In the result of the judging, when the video signal and audio signal packet identifiers of the switched channel are stored on the memory 31, the video signal and audio signal packet identifiers are set on the transport packet parser 23 S15.

It is judged whether the decoding is finished after decoding the video and audio signal through the set video signal and audio signal packet identifiers S16.

Meanwhile, in the result of the judging S14, when the video signal and audio signal packet identifiers of the switched channel are not stored on the memory 31, parsing of a PAT (Program Association Table)/PMT (Program Map Table) or a TVCT (Terrestrial Virtual Channel Table) corresponding to the switched channel is performed by controlling the transport packet parser 23 S17.

After, the video signal and audio signal packet identifiers performed parsing are stored on the memory 31 after setting them on the transport packet parser 23 S18.

In the result of the judging S16, when the decoding is not finished, parsing of the PAT (Program Association Table)/ PMT (Program Map Table) or TVCT (Terrestrial Virtual Channel Table) corresponding to the switched channel and the storing process are performed repeatedly by controlling the transport packet parser 23 S17, S18.

In the result of the judging S16, when the decoding is finished, the audio signal and video signal stopped temporarily are released S19.

As described above, the present invention is capable of reducing a time required for channel switching by storing the audio signal and video signal packet identifiers corresponding to the user request channel on the memory and outputting the audio and video signal through the stored audio signal and video signal packet identifiers.

For example, when the user switches a channel in order to change the present picture to the other picture, the process for extracting the audio signal and video signal packet identifiers after performing the parsing is selectively performed. In other words, in the present invention the time required for switching the channel can be reduced because the video signal and audio signal are outputted through the video signal and audio signal packet identifiers stored on the memory.

In addition, the present invention is capable of selecting or searching a user request channel quickly by reducing the time required for the channel switching.

What is claimed is:

1. A channel control apparatus of a digital television, comprising:
   a transport packet parser configured to extract a packet identifier of a video, audio and additional information of a user select channel;
   a microcomputer configured to receive the extracted packet identifier from the transport packet parser, store the extracted packet identifier on a memory, and set the stored packet identifier on the transport packet parser; and
   a decoder configured to decode the video and audio signal after receiving the signals through the set packet identifier, wherein the microcomputer judges whether the packet identifiers are stored on the memory, and when the packet identifiers are stored on the memory the microcomputer sets the packet identifiers on the transport packet parser, feedback-receives a decoding video and audio signal output from the decoder through the set packet identifiers, and judges whether the decoding video and audio signal are completed.

2. The channel control apparatus of the digital television according to claim 1, wherein the transport packet parser selectively extracts the video, audio and additional information from a reception antenna, or sets the packet identifier after receiving the packet identifier of the video, audio and additional information from the memory.

3. The channel control apparatus of the digital television according to claim 1, wherein the decoder decodes the video and audio signal by receiving the video and audio signal through the packet identifier of the video, audio and additional information extracted from the transport parser or by receiving the video and audio signal by the packet identifier set on the transport packet parser.

4. The apparatus of claim 1, wherein the microcomputer receives a video decoding signal and an audio decoding signal from the decoder through the set packet identifiers to determine whether the decoding is complete.

5. A channel control apparatus of a digital television, comprising:
   a transport packet parser configured to extract packet identifiers of video, audio and additional information from a reception antenna;
   a microcomputer configured to set the packet identifiers on the transport packet parser when the packet identifiers are stored on a memory after determining whether the packet identifiers are stored on the memory; and
   a decoder configured to decode a video and audio signal after receiving the video and audio signal through the set packet identifiers, wherein the microcomputer determines whether the decoded video and audio signal.are completed by receiving the decoded video and audio signal outputted from the decoder through the set packet identifiers.

6. The channel control apparatus of the digital television according to claim 5, wherein the decoder decodes the video and audio signal by being inputted the video and audio signal through the packet identifiers of the video, audio and additional information extracted from the transport packet parser or being inputted the video and audio signal through the packet identifiers set on the transport packet parser.

7. A channel control method of a digital television, comprising:
   receiving packet identifiers from a transport packet parser into a memory;
   judging whether the packet identifiers of a video and audio signal corresponding to a user selected channel are stored in the memory when the user selects a channel;
   setting the packet identifiers of the video and audio signal on the transport packet parser when the packet identifiers of the video and audio signal are stored in the memory;
   decoding the video and audio signal after receiving the video and audio signal corresponding to the user selected channel through the set packet identifiers of the video and audio signal; and
   receiving a video decoding signal and an audio decoding signal from a video decoder and an audio decoder respectively through the set packet identifiers to determine whether the decoding is complete.

8. The channel control method of claim 7, wherein determining comprises;
   temporarily stopping the video and audio signal when the user selects the channel; and
   determining whether the packet identifiers of the video and audio signal corresponding to the user selected channel are stored in the memory when the video and audio signal are temporarily stopped.

9. The channel control method of claim 7, wherein setting comprises:
   storing the packet identifiers of the video and audio signal by extracting the packet identifiers of the video and audio signal after parsing a PAT (Program Association Table)/PMT (Program Map Table) or a TVCT Terrestrial Virtual Channel Table) through the transport packet parser when the packet identifiers of the video and audio signal are not stored in the memory.

10. A system for controlling a television, comprising:
   a first memory area for storing a PAT (Program Association Table)/PMT (Program Map Table) or a TVCT (Terrestrial Virtual Channel Table), said PAT/PMT or TVCT including packer identifiers corresponding to a plurality of television channels respectively;
   a second memory area; and a processor which stores in the second memory area a packet identifier which corresponds to one of said plurality of television channels, wherein the processor retrieves the packet identifier from the second memory area when said one of said plurality of television channels is selected by a user.

11. The system of claim 10, wherein the processor sets a transport packet parser based on the packet identifier retrieved from the second memory area, said transport packet parser forwarding for display at least one of video and audio information corresponding to said one of said plurality of television channels based on said setting.

12. The system of claim 10, wherein the processor searches the second memory area in response to a channel-select signal from a user, and wherein if the processor does not find a packet identifier in the second memory area which corresponds to information in the channel-select signal, the processor searches the PAT/PMT or TVCT in the first memory area to retrieve a packer identifier which corresponds to said information in the channel-select signal.

13. The system of claim 10, further comprising:
a decoder which decodes at least one of audio and video information corresponding to said one of said plurality of television channels selected by the user, wherein the processor determines whether the information output from the decoder was properly decoded.

14. The system of claim 13, wherein if the information was not properly decoded, the processor instructs a transport packet processor to extract the packet identifier corresponding to said one of said plurality of television channels from an input television signal.

15. A method for controlling a television, comprising:
storing a PAT (Program Association Table)/PMT (Program Map Table) or a TVCT (Terrestrial Virtual Channel Table) in a first memory area, said PAT/PMT or TVCT including packet identifiers corresponding to a plurality of television channels respectively;
storing one of the packet identifiers in a second memory area;
receiving a signal designating one of said television channels; and
retrieving said one of the packet identifiers from the second memory area in response to the signal designating one of said television channels.

16. The method of claim 15, further comprising:
setting a transport packet parser based on said one of the packet identifiers retrieved from the second memory area.

17. The method of claim 16, further comprising:
forwarding at least one of video and audio information corresponding to said designated one of said television channels based on said setting step.

18. The method of claim 15, further comprising:
searching the second memory area to locate a second one of said packet identifiers corresponding to a second one of said television channels; and
if the second one of said packet identifiers is not found, searching the first memory area to retrieve said second one of said packet identifiers.

19. The method of claim 15, further comprising:
decoding at least one of audio and video information corresponding to said one of said television channel; and
determining whether the information output from the decoder was properly decoded.

20. The method of claim 19, further comprising:
instructing a transport packet processor to extract said one of the packet identifiers from an input television signal, if the information output from the decoder was not properly decoded.

21. A processing system for controlling a television, said television including a first memory area for storing a PAT (Program Association Table)/PMT (Program Map Table) or a TVCT (Terrestrial Virtual Channel Table), said PAT/PMT or TVCT including packet identifiers corresponding to a plurality of television channels respectively, said system comprising:
a processor which stores one of the packet identifiers corresponding to one of the television channels in a second memory area, receives a signal from a user designating said one of the television channels, determines whether said one of the packet identifiers is stored in the second memory area in response to said user signal and if so, retrieves said one of the packet identifiers from the second memory area.

22. The processing system of claim 21, wherein the processor sets a transport packet parser based on said one of the packet identifiers retrieved from the second memory area.

23. The processing system of claim 21, wherein if said one of the packet identifiers is not stored in the second memory area, the processor searches the second memory area to locate said one of the packet identifiers.

24. The processing system of claim 21, wherein the processor determines whether at least one of audio and video information output from a decoder and corresponding to said one of the television channels was properly decoded.

25. The processing system of claim 24, wherein the processor instructs a transport packet processor to extract said one of the packet identifiers from an input television signal, if said at least one of the audio and video information output from the decoder was not properly decoded.

* * * * *